Patented Jan. 22, 1929.

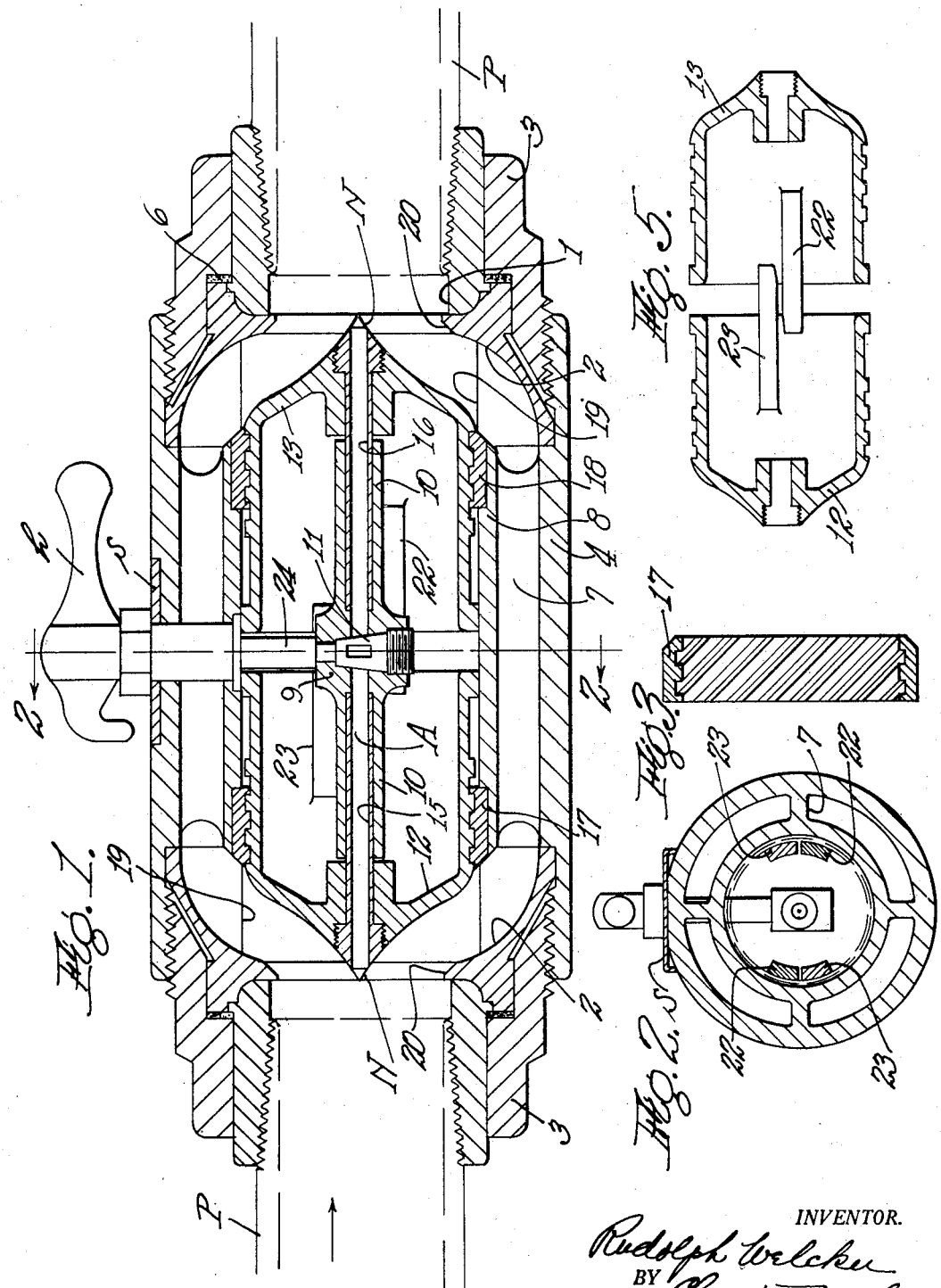

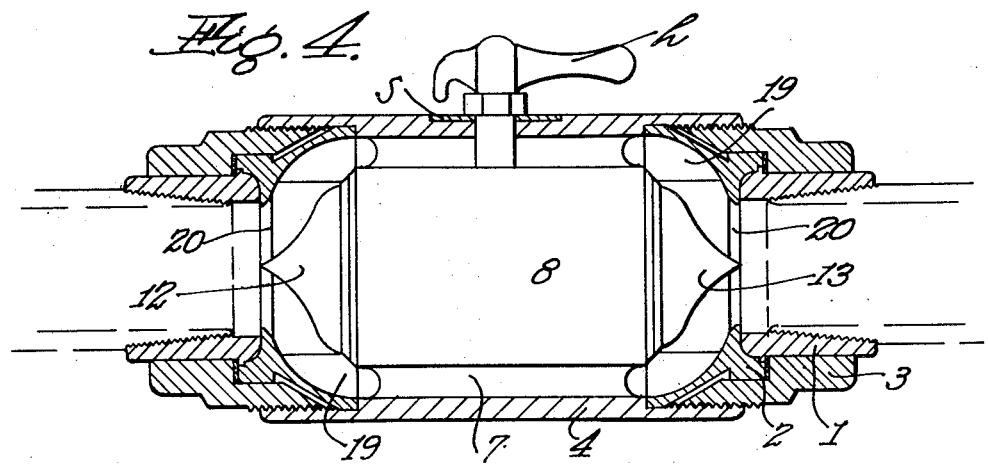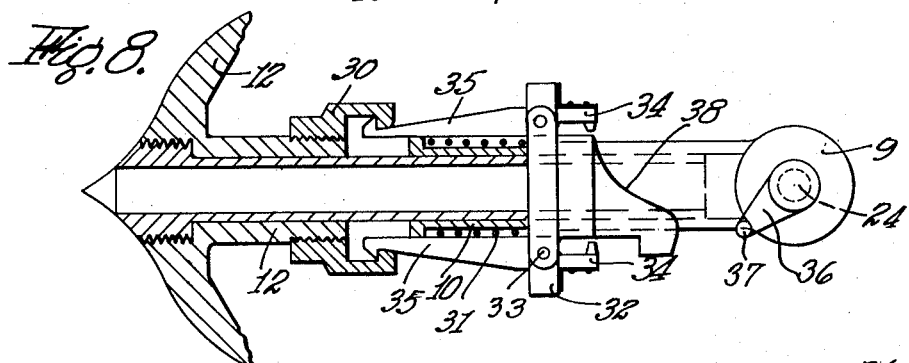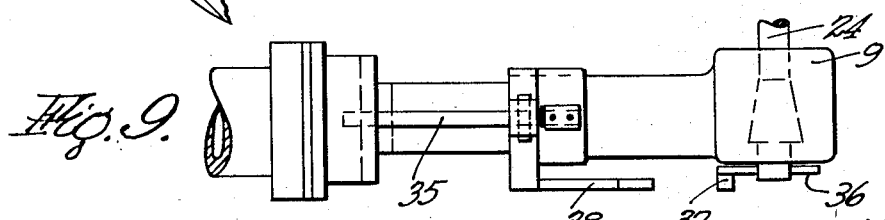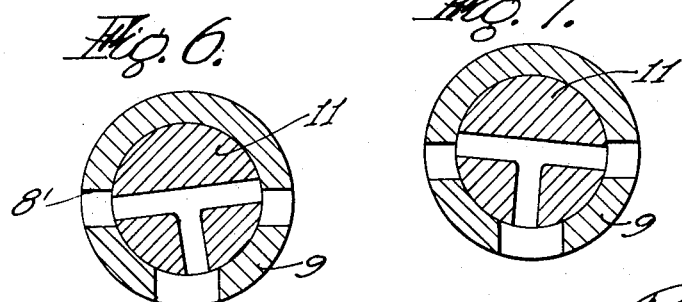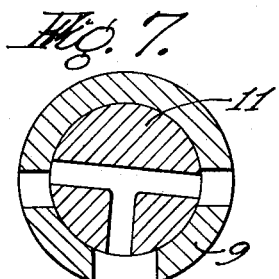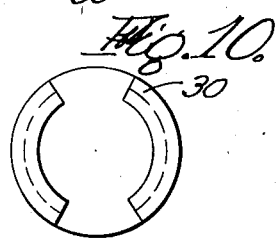

1,700,111

UNITED STATES PATENT OFFICE.

RUDOLPH WELCKER, OF SPRINGFIELD, MASSACHUSETTS, ASSIGNOR OF ONE-FOURTH TO FRANKLIN G. NEAL, OF SPRINGFIELD, MASSACHUSETTS.

VALVE.

Application filed June 15, 1925. Serial No. 37,249.

This invention relates to valves for gases or liquids. The most important or central feature of the invention is found in the means for operating the valve from the forces in the fluid or stream controlled by the valve. It has before been proposed that the force from the stream on the high pressure side of a valve be applied within a closed cylinder with a movable head to act as the valve closure. This prior art is illustrated in the Johnson Patent No. 1,030,890, dated July 12, 1912.

According to my invention, I accomplish the simple closing and opening of my valve by applying different scientific principles than found in the Johnson type of valve and by so doing I accomplish these simple results of valve operation with better efficiency. But in addition, my valve is so constructed that it will act automatically to regulate a stream flow according to the load or work desired from the stream. In this respect, it has the capacity to act like a "governor" for a water power turbine or the like. Another important function within the capacity of the new valve is that of automatically shutting off the flow in the event of an accident as by a break in the line. By arranging a plurality of the new valves in spaced apart relation in any pipe line such as a municipal water supply line or a steam line the valves may be set so as not to interfere with the normal flow and yet to automatically isolate any broken section from the rest of the line. Another and important feature of the valve is found in the arrangement of its operating parts by which the energy of a flow through the valve is used to close the valve and in so doing minimizes the chance for the water hammer effect that is an objection in many types of valves. These are some, but not all of the advantages of the new valve.

A full understanding of the invention may be obtained from the accompanying drawings, the description and the claims.

Referring to the drawings:

Fig. 1 is a cross sectional view of the valve showing the assembly of the parts when the valve is wide open.

Fig. 2 is a cross section on line 2—2 of Fig. 1 except that the casing for the control cock is shown in elevation.

Fig. 3 is a cross section of one of the threaded rings for engagement with the valve piston sleeve.

Fig. 4 is a view of the valve with certain parts in section and other parts in elevation arranged to show the nature of the interior surfaces presented to the stream flow.

Fig. 5 is a sectional view of the two valve pistons showing the overlapping bars by which the pistons are mechanically connected during their valve closing operations.

Fig. 6 is a sectional view through the control cock 9 and its ports showing a setting of the cock for regulation with an automatic stop function for the valve operation.

Fig. 7 is a like view with a setting of the cock for regulation with an automatic check function for the valve operation.

Fig. 8 is a detail sectional view from the bottom of an automatic trip device for the control cock associated with a piston rod, which may be used for some valves.

Fig. 9 is a detail view from the side of said trip device.

Fig. 10 is a detail rear view of the holding collar shown in Figs. 8 and 9.

Before proceeding to the detailed description of the parts in their exact relation a general description of the valve as shown in Fig. 1 will be given. The valve is designed with a cylinder 8 having a piston at each end (12 and 13) each movable to its own seat 20, all in direct axial alignment with the stream flow in pipe line P. Along the axis of these parts a passage A is provided which is always open except as controlled by plug 11 of control cock 9, which is designed to permit or exclude communication between passage A and the interior of cylinder 8. The plug 11 is shown operable from without the main valve casing 4 by a suitable handle h connected by stem 24. The casing 4 is also in axial alignment with the pistons, cylinder 8 and pipe line P to provide an annular passage between cylinder 8 and casing 4 and of proper capacity through the valve. As indicated in a general manner this passage from pipe section to pipe section is designed to offer a minimum obstruction to the stream flow through the valve. The arrangement results in submerging the cylinder 8 and pistons 12 and 13 in the center of the stream or power flow where the velocity is the greatest and the pressure normal to the flow is the least.

The greatest impact pressure obtainable from the stream under this arrangement is at point N which meets the stream like the stem of a driven ship. By providing passage A and valve 9, this impact pressure of the stream at N may be directed into cylinder 8, and thereby confined either wholly or partially for conversion into a working pressure to press pistons 12 and 13 toward their seats 20 or hold them in a valve regulating position. This arrangement results in a means to generate a pressure within cylinder 8 from the impact force of the power flow. It will readily be appreciated that the character of the forces acting on the outside faces of pistons 12 and 13 differ widely from the character of the forces acting on the inside faces of the pistons and the resultant action or position of the pistons under these forces is the primary consideration of this description. The action on piston 12 when opposed to the stream when pressing in the direction of the arrow in Fig. 1, is quite different from the action on piston 13 which is subjected to the suction action of the stream tending to draw it to the seat 20. The fact that the pressure within cylinder 8 is opposed by the forces acting on the outer face of one piston and is assisted by those acting on the outer face of the other piston, presents the opportunity of making the resulting action or positioning of the pistons whatever is desired over a range so as to greatly increase the efficiency of the valve under widely varying conditions. This is accomplished by mechanically connecting the two pistons together so that the movement of one will necessarily cause the movement of the other. All the forces acting will be thus combined to give a wide range of desirable valve operations effected by a variation of the pressure within cylinder 8 under the control of cock 9. The latter may be operated from without the main valve casing to immediately effect the results desired, or it may be set with relation to the desired operation of the valve so that the results will be effected automatically by the forces acting in the stream flow.

To mechanically connect the pistons 12 and 13, I provide the oppositely threaded sleeves 17 and 18, one of which is shown in Fig. 3. These sleeves are mounted against rotation in the ends of cylinder 8 and are respectively engaged by corresponding threads on the sleeves of pistons 12 and 13 as indicated in Fig. 1. The threads are made with a pitch at 45° for example, to cause substantial axial movement of the pistons for small angular movements. Longitudinally arranged bars 22 on the interior of one piston sleeve are arranged to constantly overlap corresponding bars 23 on the other piston sleeve. These are indicated in Figs. 1 and 2 in their proper relation at either extreme position of the pistons. With this construction the longitudinal movement of one piston as 13, will cause a rotation which will be transmitted through bars 22 and 23 to the other piston as 12 to rotate it in the same direction. Since the piston and sleeve on one end of the valve are threaded in an opposite direction to what the piston and sleeve on the other end of the valve are threaded, these pistons will be moved longitudinally in opposite directions, when rotated in the same direction. Thus with piston 12 opposed to the stream flow indicated by the arrow in Fig. 1 the movement of piston 13 toward its seat 20 will cause a like movement of piston 12 toward its seat 20 but of course in the opposite direction. These movements may take place (because the pistons are harnessed together and the forces acting on one assist the other) even though the pressure within cylinder 8 is not sufficient to independently cause a movement of piston 12 for example when opposed by the stream. And such movements might very well occur in any one of a wide range of conditions under which it is desirable to close valve 12 partially or wholly toward its seat by the force of the stream acting within the cylinder 8.

There is another advantage in mechanically connecting the two pistons 12 and 13 for a simultaneous movement toward their seats. The piston 13 on the low pressure side has a tendency to close too rapidly just as piston 12 has a tendency to close too slowly or not at all. Consequently, the opposite defects (at times when they are defects) of the piston closures tending to act independently are compensated to the advantage of each piston and to the whole valve, when the pistons are mechanically connected to necessarily move together in opposite directions.

The operation of opening the valve is accomplished by turning plug 11 to drain cylinder 8 through passage A to the low pressure side. The valve arrangement already described respecting the combined action of the pistons is particularly useful in the opening operation as well as in the closing operation. The tendency in opening is substantially opposite to that of closing. Piston 12 tends to open too fast under the impact pressure of the stream and piston 13 tends to be held closed by the suction. But since the two pistons are mechanically connected each will compensate for the other's tendency and an easy opening action is obtainable.

The pistons 12 and 13 are provided with hollow piston rods 15 and 16. These rods slide in the lateral extensions 10 of the control cock 9 and together with such extensions form the passage A through the valve. The control cock 9 is supported in position from the interior wall of cylinder 8, as indicated in Fig. 2. Each piston sleeve is also provided with slidable guiding contact with the interior of cylinder 8 as indicated in Fig. 1. By these arrangements the piston valve closures 12 and 13 are caused to move accurately to their seats 20 as they are given a slight rotary motion by their threaded engagement with sleeves 17 and 18.

The cylinder 8 may be cast integral with valve casing 4 having the connecting webs 7. The handle h is suitably connected with the plug 11 as shown in Fig. 1. A convenient means for connecting casing 4 with the pipe line is indicated at each end of the valve. A removable ring 2 provided with a valve seat 20 is accurately positioned against the shoulder in casing 4. Circumferentially spaced webs 19 on ring 2 engage registering slots in sleeve 18 and the edge of cylinder 8 to thereby position all these parts against relative rotation. Sleeve 18 is positioned against a shoulder on the interior of cylinder 8. Just back of valve seat 20 is a suitable seat for the head of union member 1 which is screwed to pipe section P. An exterior sleeve 3 has a shoulder engagement with member 1 and ring 2 so that as this sleeve 3 is screwed into engagement with casing 4 all the parts are forced into the desired positions shown in Fig. 1 with a washer 6 at the critical point to provide against leakage. The connecting parts at each end are the same and are clearly shown in the drawings.

In the operation of the valve, the position of the control plug 11 will be indicated by the position of handle h with relation to scale S. That position in which there is direct and full communication from passage A on the high pressure side to the interior of cylinder 8 and no communication with passage A on the low pressure side, is the fully closed position for the valve. Reversing these conditions so that cylinder 8 has communication only with passage A on the low pressure side, gives the fully open position for the valve. The description of the valve and its operation previously given will make the operation for these effects of direct closing and opening perfectly clear.

The operation of the valve with respect to certain features of automatic regulation or control will now be considered.

Referring to Fig. 6, the control cock therein has its ports arranged for one type of automatic regulation. There is full communication between the high pressure side of passage A and the cylinder 8 through port 8'. There is a throttled communication between cylinder 8 and the low pressure side of passage A. With this type of valve setting it will be clear that the pressure within cylinder 8 may be less (assuming that the velocity of the stream flow is below a certain figure) than the amount necessary to close the valve, because a sufficient amount of the available impact pressure is permitted to escape through the throttled outlet to the low pressure side. By thus dissipating a part of the available impact pressure, the remainder still acts to generate a static pressure confined in cylinder 8 and maintain this pressure within cylinder 8. This latter pressure may be made sufficient to hold pistons 12 and 13 in equilibrium against the forces of the stream acting against the pistons on their outer surface. For example, assume a water turbine load connected to pipe line P on the low side of the valve. As long as this load is constant and all other conditions of the pipe line feed are constant, the automatic regulating valve may be arranged with its movable parts in equilibrium to such load. The pistons 12 and 13 are then open just enough to permit the flow through the valve of the desired energy to carry the load. The control cock 9 has its plug 11 set, for example, like the arrangement of Fig. 6. If an increased load is placed on the water turbine, it will naturally tend to slow up unless it receives more energy. With my valve set as described, the slowing up of the turbine under its increased load will increase the pressure at the valve since the velocity of the stream is decreased and therefore the impact pressure will no longer be sufficient to hold the pistons in their original positions of equilibrium under the original conditions of the power flow. Under these new conditions, the pistons 12 and 13 will automatically open to increase the flow of energy through the valve to drive the turbine at its normal speed under its increased load. The valve will thus automatically find its new position of equilibrium with the pistons 12 and 13 open wider than before to permit the increased volume of flow through the valve. The original velocity for the control cock setting causes the same impact pressure to work in the interior of cylinder 8 and the pistons 12 and 13 are thus held in their new positions. It is important to note that the forces acting to hold the pistons in their positions of equilibrium depend primarily on the velocity of the flow and its impact pressure on the piston opposing the flow and not upon the volume passing through the valve. Therefore, the volume delivered through the valve may be automatically varied according to the needs on the low pressure side of the valve and the valve pistons will find a new position of equilibrium according to the predetermined velocity desired for the flow through the pipe line. If, in the example given, the water turbine has its load descreased, the velocity of the stream will immediately start to increase, the impact pressure will increase, the working pressure within cylinder 8 will change, and the pistons 12 and 13 will be pushed toward closed position until the velocity of the stream flow is brought back to normal as it is throttled by my valve. If there are such abnormal conditions such as a break in the pipe P on the low pressure side, the sudden and great increase in velocity will cause pistons 12 and 13 to completely close as the impact pressure will then jump to its maximum before there is time to find a position of equilibrium less than complete closure.

The above description of one use of my valve covers the particular case where it acts as an automatic regulator or governor for a water power plant or in any analogous use and is illustrative only. In this use also, it acts as an automatic stop and is thus a protecting device against the effects of sudden and great increase of velocity from the high pressure side of the valve and against some of the effects of a break in the line.

When it is desirable for the valve to automatically close the pipe line P, it is usually desirable to hold it closed, especially in a large valve, until deliberately opened after the causes of the accident have been removed. I have, therefore, shown in Figs. 8, 9 and 10 means to automatically turn the control cock plug 11 to complete valve closing position from any setting for automatic action.

Referring to Fig. 8 a bar 36 provided with a knob 37 is connected to the stem 24 of plug 11 extending below, from the control cock 9. The knob 37 is arranged in the path of a cam 38 mounted on the collar 32 which can slide on extension 10 being held against rotation by a pin on the collar engaged in a longitudinal slot of the extension 10. The parts are arranged so that as the cam moves to its extreme right hand position with collar 32, it engages knob 37 to turn bar 36 and thus the plug 11 to the position for its ports to have the fully closed position for the piston previously discussed. A spring 31 coiled around extension 10 normally tends to move collar 32 to its extreme right hand position. This spring lies as shown between collar 32 and a collar at the end of extension 10. The collar 32 has a pair of hooked arms 35 pivoted at 33 with extensions 34 on one side of the pivots and cam shaped hooks at the other side of the pivots. The hooks are designed to automatically slide under the segmental shoulders of collar 30 fixed to piston 12. These shoulders are indicated in Figs. 8 and 10. Inwardly extending lugs on extensions 34 are designed to engage collar 32 and limit the outwardly moving tendency of arms 35 brought about by the leaf springs attached to extensions 34 and bearing on collar 32 as shown in Fig. 8.

With the parts arranged as shown in Fig. 8 assume that an automatic movement of the piston 12 occurs to carry it to the left. As previously described such movement will cause a turning movement of the piston 12. This movement turns collar 30 until as piston 12 reaches closed position, the openings between the segmental shoulders on 30 (see Fig. 10) are brought into registering position with the hooks on arms 35 and these are released. Spring 31 then snaps collar 32 to the right and cam 38 engages knob 37 to turn plug 11 to completely closed position. The valve is then held closed until handle h is used to turn plug 11 to completely open position for the valve. When piston 12 is completely opened, the parts will automatically engage as shown in Fig. 8. It is obvious that this automatic trip may be associated with either piston 12 or piston 13 or both but in the latter case an additional arm 36 and knob 37 are desirable.

Referring to Fig. 7 I have shown a control cock setting similar to that shown in Fig. 6 except that the relation of the ports from the high pressure and low pressure sides of the passage A to cylinder 8 are reversed. This setting is primarily arranged for an automatic closure of the valve upon a sudden reversal in the direction of flow through the valve. In such an event, the impact pressure of the flow in the reverse direction will be converted to a working pressure within cylinder 8.

If my valves are arranged in a pipe line in spaced apart relation, and the control cocks set like Fig. 6 in every other valve and like Fig. 7 in the intermediate valves, the line will be most effectively protected. The pipe section between each pair of valves will have at one end a valve which will close automatically in the event of an abnormal flow from one direction, and a valve at the other end which will close automatically in the event of an abnormal flow from the opposite direction. In this way, if a break occurs in any section, that section will be automatically cut out of communication with the rest of the pipe line or completely isolated since fluid cannot reach the broken section from any other sections. This arrangement forms a most effective means of protecting an important service line without interfering with its normal function. It is particularly important in steam lines, in protecting municipal water supply lines, in oil lines, in compressed air lines, and it is particularly helpful in the case of fire and earthquake hazards when the time element is all important in maintaining all possible workable parts of such lines.

Having described my invention I claim:

1. A pipe valve comprising mechanism operable by pressure at either side of the valve, means movable by said mechanism to vary the opening through said valve, a control device adjustable to apply the velocity head of the pipe line pressure to said mechanism from either side of the valve, said control device being adjustable independently of the movements of said mechanism.

2. A pipe valve comprising mechanism within the valve casing operable by the pressure at either side of the valve, means movable by said mechanism to vary the opening of a main passage through said valve, a control device to vary the opening of a pressure passage through said valve and to said mechanism independently of the main passage, said control device being adjustable independently of the movements of said mechanism.

3. A pipe valve comprising a casing having two aligned ports, a pressure cylinder and two oppositely disposed piston closure heads therein, one for each port, the casing and cylinder forming an annular passage from port to port controlled by each piston head, means connecting said piston heads to force their movements in opposite directions whenever sufficient pressure is applied to move one of them, and a control device to apply the velocity head of the pipe line pressure within said cylinder, said control device being adjustable to apply the pressure from either side of the valve independently of the piston head movements.

4. An automatic regulating valve structure comprising in combination, a valve casing for insertion in a pressure flow and provided with a valve seat, a valve member having a movable tapered head for adjustment toward and from said seat, power applying mechanism in the interior of said casing and operable upon said head to move it to adjusted position, said mechanism having means to automatically cause its operation to move said head in either direction under the influence of variations in the pressure flow applied directly through said head whereby said head may be adjusted to secure a desired normal velocity of the stream by varying the volume permitted to pass the valve.

5. An automatic regulating valve comprising in combination, a valve casing provided with two spaced apart valve seats, a valve structure having oppositely disposed tapered heads each movable toward and from one of said seats, power applying mechanism between said heads and operable thereon to move them in proportion to changes of velocity in either direction of a stream through a pipe line within which said valve is placed and control means adjustable independently of the valve opening to determine the normal velocity through the valve.

6. A valve construction comprising a valve casing having two spaced apart oppositely disposed valve seats, a cylinder spaced from the walls of said casing between its valve seats, a piston like valve member at each end of said cylinder adapted to rest in closing position on its adjacent valve seat, means to move said piston members to and from their seats by the pressure within said cylinder generated by the stream to be passed or stopped by said valve, said means having a control device adjustable independently of the position of the piston members for admitting and excluding the velocity head pressure of the fluid from the stream to said cylinder.

7. A valve construction comprising a valve casing having two spaced apart valve seats, an axially aligned cylinder spaced from the inner walls of the casing, a relatively small pipe section axially arranged within the cylinder, a piston like valve member fitted in each end of the cylinder one for each valve seat and having an open ended hollow piston rod in slidable engagement with said pipe section whereby a passage is provided entirely through the valve independently of said valve seats, a control cock for such passage with a port to the inside of the cylinder and a mechanical connection between said piston members to cause them to move together in opposite directions.

8. A valve construction comprising a valve casing having two oppositely disposed valve seats, an axially arranged cylinder spaced from the interior wall of the casing between said seats, a piston like member at each end of the cylinder provided with a head tapering toward its adjacent valve seat, an open ended piston rod extending through the nose of each piston head and backwardly into the cylinder, a control cock within the cylinder having pipe like extensions to receive said piston rods in slidable engagement, a stem for the control cock extending to the outside of the casing, mechanical driving connections between the piston members operable to drive one piston member from the other in opposite directions to and from their valve seats, all constructed and arranged to operate the valve by the fluid forces in a conduit acting on the piston members under the control of said cock for their resultant effects.

9. A power valve comprising in combination, a valve casing provided with two spaced apart valve seats, a power cylinder between and in line with the axes of said seats, a movable head in each end of the cylinder adapted to control the flow past its adjacent seats, and mechanical means connecting said heads to cause them to move together and a control device for the valve movements arranged for adjustment independently of said mechanical means, said control device including a control valve located in a control passage through the power cylinder and movable heads whereby the interior of the cylinder may communicate through such valve with the said valve casing through each movable head.

10. A power valve comprising in combination, a valve casing provided with two valve seats, a power cylinder in line with the axes of said seats, a movable head in each end of the cylinder provided with an opening to the cylinder, a control means for each opening operable from without the casing, said head being arranged to move back and forth in the cylinder without changing the adjustment of said control means.

11. A power valve comprising in combination, a valve casing provided with a valve seat, a power cylinder in line with the axis of said valve seat, a movable head in said cylinder provided with an opening through the head to the cylinder, power applying means in addition to said movable head and operable by pressure within the cylinder to move said head, and adjustable means to determine the effective area of said opening whereby pressure may be generated within the cylinder from a power flow within which the valve is placed, said means being arranged for adjustment independently of the position of said head.

12. An automatic valve comprising in combination, a valve casing with a valve seat, a power cylinder in line with the axis of the seat and spaced from the walls of the casing, a movable head in the end of said cylinder adapted to fit said seat, a restricted opening through the head to the cylinder whereby power may be automatically generated within the cylinder from the power flow within which the valve is placed and in proportion to the velocity of such flow all constructed and arranged for said opening to maintain its function during the automatic operation of the valve without interference by the back and forth movements of said head in adjusting the flow of the stream.

13. An automatic valve comprising in combination, a valve casing with a valve seat, a power cylinder in line with the axis of the seat and spaced interiorly of the casing, a movable head in the cylinder adapted to fit the valve seat and provided with a relatively small opening through the head to the cylinder independently of the seat, mechanical power applying mechanism in the cylinder and connected to said head to move the latter and operable in proportion to the power generated in the cylinder from the flow of a stream within which the valve is placed, said opening being arranged to function without interference by said mechanism during the normal automatic reciprocations of said head.

14. A pipe valve comprising a casing having two aligned ports, a pressure cylinder and two oppositely disposed piston closure heads therein one for each port, said pistons being mechanically connected to move in opposite directions, the casing and cylinder forming an annular passage from port to port controlled by each piston head, a pipe passing through each piston head and the cylinder, a control valve in said pipe having a port to the cylinder, said control valve being adjustable to determine the application of pipe line pressure within the cylinder from either side of the valve.

15. A pipe valve comprising a casing having two aligned ports, a pressure cylinder and two oppositely disposed piston closure heads therein one for each port, said heads having oppositely threaded connections with said cylinder and interengaging parts between the heads, all arranged to cause simultaneous movements of the heads in opposite directions under pipe line pressure and a control device operable to direct said pressure to the interior of the cylinder.

16. A pipe valve comprising a casing having two aligned ports, a pressure cylinder and two oppositely disposed piston closure heads therein one for each port, mechanism arranged between said heads for one to move the other to its various port controlling positions, adjustable means independent of said mechanism to apply the pipe line pressure to the interior of said cylinder through at least one of said piston closure heads.

17. A valve containing a cylinder having a plunger head automatically movable parallel to the axis of the valve inlet and outlet ports and movable under fluid pressure to regulate the flow through the valve, said head having a restricted passage through it with branches, one leading to the interior of the cylinder and one to a point of lower pressure outside the cylinder and adjustable means within said passage to direct the available pressure flow energy in desired proportions to the interior of said cylinder and to said point of lower pressure outside the cylinder.

18. A pipe valve comprising mechanism operable by pressure at either side of the valve, means movable by said mechanism to vary the opening through the valve, means to admit pipe line pressure to operate said mechanism from either side of the valve, and means to apply said pressure arranged to function automatically under the sole control of the pipe line pressure.

19. A valve comprising a tapered plunger head to regulate the flow through the valve and a pressure chamber arranged with the plunger head to operate the latter from a power stream directed against said head, a control valve in a restricted passage extending through the nose of the plunger head to said cylinder and to the delivery side of the valve, said control valve being adjustable to direct any desired part of the normal flow through the nose of the plunger head to the interior of the cylinder and any remainder to the delivery side of the valve.

20. In combination a pipe line and devices to control the flow therethrough comprising two valves in spaced relation in the pipe line, each valve being adjustable to permit normal pipe line flow, one valve having means automatically operable from the pipe line pressure to close its main port under abnormal flow velocity through the pipe line in one direction and the other valve having means automatically operable from the pipe line pressure to close its main port under abnormal flow velocity through the pipe line in the opposite direction, each of said means being automatically operable when said valves are adjusted to permit normal pipe line flow.

21. In combination a pipe line and devices to control the flow therethrough comprising two valves in spaced relation in the pipe line, each valve being adjustable to permit normal pipe line flow, one valve having means automatically operable from the pipe line pressure to close its main port under abnormal flow velocity through the pipe line in one direction and provided with a supplementary port for access to such pressure independently of the main port and the other valve having means automatically operable in the same manner under such abnormal flow velocity in the opposite direction, each of said means having a control valve for its supplementary port adjustable to predetermine the relation of its automatic operation to the velocity and direction of the pipe line flow.

22. A valve comprising a casing, automatic means within the casing to open and close the valve by the power of the stream flow or tendency to flow through the casing, means providing for a partial flow under full velocity head through the valve independently of the operation of said automatic means, said automatic means being operable according to variations of the velocity of said partial flow and a control valve for the partial flow to cause such variations.

23. A pipe valve comprising a casing with a valve seat, a closure member movable to and from said seat, and pressure mechanism including a cylinder having a plunger head with means constraining it to move by a rotary sliding action, said plunger head being connected to said closure member to operate the latter according to the pressure in the cylinder and a control device operable to direct pipe line pressure to the cylinder and exhaust it therefrom for the operation of the valve.

24. A pipe valve comprising a casing with inlet and outlet ports, a pressure cylinder between said ports having oppositely disposed plunger heads, one of which acts as a valve closure and each of which is movable toward and away from the other, and screw threaded jack mechanism connected to both of said plunger heads to transmit motion from one to the other with a rotary movement in the same direction and causing a sliding movement of the plunger heads in the opposite direction and a control device operable from without the casing to direct pipe line pressure to or from said pressure cylinder for operating the jack mechanism to open or close the valve by the movement of said plunger heads.

25. A valve construction comprising in combination, a valve casing, a cylinder with a tapering closure at one end supported and spaced centrally from the walls of the casing, a piston valve supported and guided by said cylinder and provided with a tapering end extending toward the valve seat, said cylinder and piston forming a closed hollow body within the casing, a hollow piston rod and hollow guide therefor extending from end to end axially of said hollow body, a valve in said guide and ports to connect the passage through the piston rod and guide with the interior of said hollow body when desired and means to operate said valve from without the casing.

26. A valve structure comprising a casing and valve seat therein, power mechanism inside the casing including a closed fluid container, a piston closure adapted to move to and from said valve seat, a telescoping pipe conduit passing from one end of the container to the other and open at both ends, and a control valve in said conduit operable to open and close communication between said container and said conduit, all constructed and arranged for the fluid pressure in said container to be regulated by said control valve and move said piston closure solely by the force of the stream in which the valve structure is placed.

27. A valve construction comprising in combination, a valve casing, a cylinder and piston supported in spaced apart relation to the walls of said casing and centrally thereof, the walls of the casing, cylinder and piston being suitably shaped to minimize the resistance to the free flow of a fluid through the valve casing, a valve seat in the casing upon which said piston is adapted to fit as a closure valve, a hollow piston rod extending through and fastened to the piston and extending within and axially of the cylinder, telescoping pipe means extending through the head of the cylinder opposite to said piston head within which means said piston rod telescopes whereby a central passage is provided from end to end of the cylinder and piston, a control valve in said pipe means with an opening to the interior of the cylinder and operable from without the casing to connect the central passage from either end as desired to the interior of the cylinder.

In testimony whereof I have affixed my signature.

RUDOLPH WELCKER.